(12) United States Patent
Daniel

(10) Patent No.: US 8,581,146 B2
(45) Date of Patent: Nov. 12, 2013

(54) AUTOMATIC WIRE FEEDING SYSTEM

(75) Inventor: Joseph A Daniel, Sagamore Hills, OH (US)

(73) Assignee: Lincoln Global, Inc., City of Industry, CA (US)

( * ) Notice: Subject to any disclaimer, the term of this patent is extended or adjusted under 35 U.S.C. 154(b) by 1351 days.

(21) Appl. No.: 12/255,954

(22) Filed: Oct. 22, 2008

(65) Prior Publication Data

US 2010/0096375 A1    Apr. 22, 2010

(51) Int. Cl.
*B23K 9/10* (2006.01)

(52) U.S. Cl.
USPC .............. 219/137.31; 219/137.7; 219/137.71; 219/137 R

(58) Field of Classification Search
USPC ........ 219/137 PS, 137 R, 136, 137.2, 137.31, 219/137.7, 137.71
See application file for complete search history.

(56) References Cited

U.S. PATENT DOCUMENTS

| | | | | |
|---|---|---|---|---|
| 3,978,311 | A | * | 8/1976 | Toth .......................... 219/137.71 |
| 4,079,231 | A | * | 3/1978 | Toth .......................... 219/130.32 |
| 4,300,036 | A | * | 11/1981 | Johansson ................. 219/130.33 |
| 4,538,047 | A | * | 8/1985 | Nakano et al. ............. 219/125.1 |
| 6,627,850 | B1 | * | 9/2003 | Koga et al. ................. 219/137.71 |
| 6,794,608 | B2 | * | 9/2004 | Flood et al. ................ 219/130.51 |
| 2006/0138116 | A1 | | 6/2006 | Lipnevicius |
| 2008/0041834 | A1 | | 2/2008 | Nishimura et al. |

FOREIGN PATENT DOCUMENTS

| | | |
|---|---|---|
| EP | 0972604 A2 | 1/2000 |
| JP | 62-086972 U | 6/1987 |
| JP | 62-199269 A | 9/1987 |
| JP | 63-013674 A | 1/1988 |
| JP | 03-297564 A | 12/1991 |
| JP | 07-155948 A | 6/1995 |
| JP | 2000-000670 A | 1/2000 |
| JP | 2000-158133 A | 6/2000 |
| JP | 2002-160059 A | 6/2002 |
| JP | 2002-205169 A | 7/2002 |
| WO | WO 2010/046761 A1 | 4/2010 |

OTHER PUBLICATIONS

Intl. Preliminary Report on Patentability for counterpart Intl. App. PCT/IB2009/007190 (WO2010046761); 9 pgs.; (Jan. 31, 2011).
Written Opinion for Intl. App. PCT/IB2009/007190 (WO2010046761); 7 pgs.; (posted Apr. 22, 2011 at <http://www.wipo.int/pctdb/en/wo.jsp?WO=2010046761> accessed May 19, 2011).
ISR for counterpart Intl. App. PCT/IB2009/007190 (WO2010046761); 2 pgs.; Mar. 4, 2010).

* cited by examiner

*Primary Examiner* — Henry Yuen
*Assistant Examiner* — John Wasaff
(74) *Attorney, Agent, or Firm* — Perkins Coie LLP

(57) ABSTRACT

An apparatus and method for feeding welding wire, where the apparatus contains a wire feeding device which pays out a wire and a power source which provides a current and voltage to the wire while it is being paid out. The apparatus further includes a detection circuit which detects a short circuit in the wire when the wire makes contact with a work piece or the like, and upon detection of the short circuit the wire feeding device stops feeding the wire so that a desired stick out distance is achieved.

18 Claims, 3 Drawing Sheets

AUTOMATIC WIRE FEEDING SYSTEM

BACKGROUND OF THE INVENTION

1. Field of the Invention

Devices, systems, and methods consistent with the invention relate to a method and apparatus automatically feeding wire, in particular welding wire.

2. Description of the Related Art

During the process of gas shielded MIG (metal inert gas) welding a MIG electrode (or MIG wire) is continuously paid off of a spool and passed to and through a welding gun. This is the case in both automatic and semi-automatic welding. Because the welding wire originates from a spool or bin of welding wire, at a point in time during the welding process the end of the wire is reached. When the wire is fully depleted the welding process must stop and a new spool, supply or bin of welding wire must be obtained.

When a new supply of welding wire is provided for the welding operation the wire must be initially fed through a wire feeder, or the like, to the welding gun. In most welding operations, a particular wire "stick out" length must be maintained to ensure a proper weld occurs. "Stick out" is a measure of the length of welding wire which extends from the contact tip of the welding gun. In related art systems, an operator must first feed the welding wire through the wire feeder and then continue to feed the wire until the operator believes he/she has provided sufficient wire for the "stick out."

This process has its disadvantages. For example, in an automatic welding system the contact tip is typically located behind a protective barrier or shielding to protect the operator and prevent interference with the automated welding process. This results in an operator initiating the wire feeding operation at a remote distance from the contact tip and requires guessing as to when sufficient "stick out" is provided. The operator then must access the welding area to determine if the stick out length is proper. If the stick out is too long the operator must cut the excess off, while if the stick out is not sufficient the operator must return to the wire feeder control and repeat the process. The operation can be alternatively completed with two operators, but this results in an inefficient use of the operators' time and results in delay and operational down time.

BRIEF SUMMARY OF THE INVENTION

In an embodiment of the present invention a welding wire feeding apparatus contains a wire feeding device which feeds a wire to a welding gun, a power source which provides a current and a voltage to the wire while the wire feeding device is feeding the wire, and a short circuit detection circuit coupled to the wire feeding device. When the short circuit detection circuit detects a short circuit in the wire the wire feeding device stops feeding the wire based on the detection of the short circuit.

BRIEF DESCRIPTION OF THE DRAWINGS

The above and/or other aspects of the invention will be more apparent by describing in detail exemplary embodiments of the invention with reference to the accompanying drawings, in which.

DETAILED DESCRIPTION OF EXEMPLARY EMBODIMENTS

Figure 1:
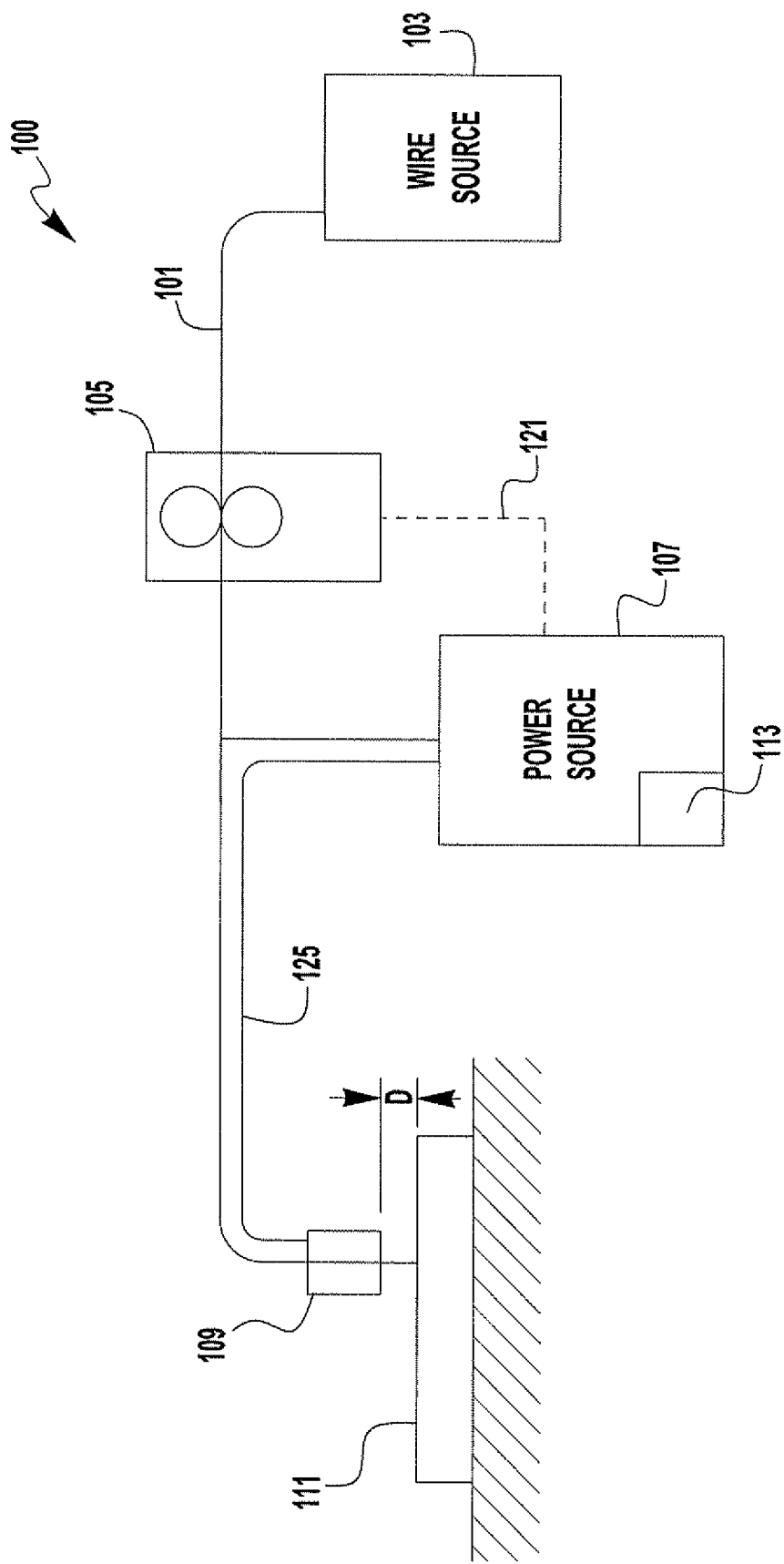
FIG. 1 illustrates a diagrammatical representation of an exemplary embodiment of the present invention.

Exemplary embodiments of the invention will now be described below by reference to the attached Figures. The described exemplary embodiments are intended to assist the understanding of the invention, and are not intended to limit the scope of the invention in any way. Like reference numerals refer to like elements throughout.

In FIG. 1, a system 100 according to an exemplary embodiment of the present invention is depicted. In the system 100, a wire 101 is paid out from a wire source 103, which can be a wire spool or the like, and is directed and passed through a wire feeding apparatus 105. The wire feeding apparatus 105 feeds the wire 101 to a welding gun 109 having a contact tip 123. The contact tip 123 is electrically coupled to the power source via the connection 125, through which the welding waveform is passed for the welding operation. The welding gun 109 and contact tip 123 can be of any known or commonly used type or configuration and can be that of an automatic, semi-automatic or hand held type, as the present invention is not limited in this regard. Additionally, there is no limitation as to the distance between the welding gun 109 and the wire feeding apparatus 105. For purposes of conducting a welding operation the wire 101 extends from a tip of the welding gun 109/contact tip 123 a distance D, commonly referred to as "stick out." For purposes of welding the welding gun 109 is located adjacent a work piece 111 to be welded.

For various welding operations the distance D is to be maintained throughout the welding process, and is to be set prior to welding. An exemplary method of employing the present invention will be discussed in more detail below.

Coupled to the wire 101 is a welding power source 107 which passes a voltage and current through the wire 101. The welding power source 107 can be of any commonly known or used type used for welding operations. The present invention is not limited in this regard. In an exemplary embodiment of the present invention, the welding power source 107 is coupled (as shown via dashed line 121) to the wire feeding apparatus 105 to communicate with or otherwise control, the wire feeding apparatus 105 during set up and operation. The power source 107 may be connected to the wire feeding apparatus 105 through any method, including a hard wire or wireless connection methodology.

In an embodiment of the invention, the power supply 107 contains a processor or computer like component (not shown) to receive input through various sensors and/or a user and control operation of the wire feeding apparatus 105 (e.g., start, stop, wire feed rate, etc.)

In an exemplary embodiment of the present invention, the power supply 107 contains a detection circuit 113 capable of detecting a short circuit between the wire 101 and the work piece 111. The detection circuit 113 can be of any configuration capable of detecting an increase in current, decrease in voltage, decrease in resistance or a combination thereof, within the wire 101 which signifies a short circuit between the wire 101 and the work piece 111. Because those of ordinary skill in the art have sufficient knowledge of such circuitry, a detailed discussion regarding the architectures or topologies of such a circuit will not be incorporated herein. However, the discussion of an exemplary embodiment is set forth below with regard to FIG. 3.

The power supply 107 (through an internal computer, processor, etc.) is capable of detecting that a short circuit has occurred via the detection circuit 113 and controls the wire feeding apparatus 105 accordingly. For example, when a short circuit is detected by the detection circuit 113 a signal is sent from the power supply 107 to the wire feeding apparatus 105 to stop the wire feeding process. This permits the wire 101 to be stopped at a set stick out distance D without requiring the user to stop the wire feeding process.

As shown in an exemplary embodiment of the present invention, the contact tip 123 is coupled to the power source 107/detection circuit 113 via the connection 125 to allow the contact tip 123 itself to act as a touch sensor. Similar to what is described above regarding the wire 101, the contact tip 123 itself is used as the touch sensor, and rather than touching the surface 111 with the wire 101 the tip 123 makes contact. Thus, when the contact tip 123 makes contact with the work piece 111 a short will be created. This short will be detected within the power source 107 (via control circuitry or the like) and allow the system 100 to determine that contact with the work piece 111 has been made. This embodiment can aid in setting the distance D, which will be explained in more detail below.

Figure 3:
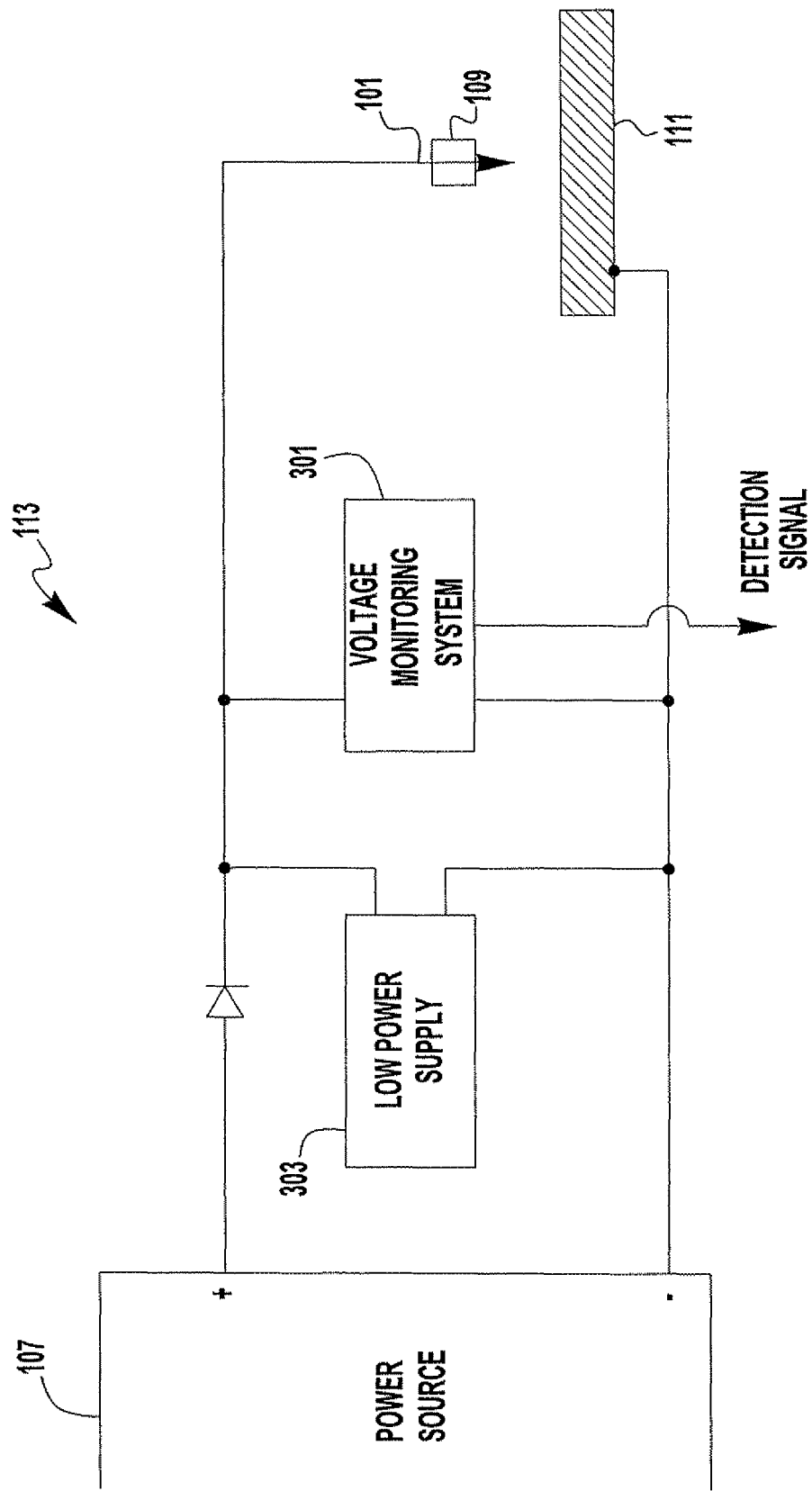
FIG. 3 illustrates a diagrammatical representation of a detection circuit which can be employed with an embodiment of the present invention.

FIG. 3 depicts an embodiment of a detection circuit 113 that can be used with the present invention. It is noted, however, that the present invention is not limited to the detection circuit 113 shown in FIG. 3 and those of ordinary skill in the art are aware of, or are otherwise capable of implementing, detection circuits with varying configurations. The detection circuit 113 shown in FIG. 3 employs both a low power supply 303 and a voltage monitoring system 301. The low power supply 303 provides a low voltage, for example in the range of 12 to 48 Vdc, with current limitation to the electrode 101, as the electrode 101 approaches the work piece 111. The voltage monitoring system 301 monitors the voltage in the electrode 101 and compares the measured voltage to a reference voltage. When the voltage in the electrode 101 reaches or surpasses the reference (when a short occurs between the electrode 101 and the work piece 111) the voltage monitoring system 303 emits a detection signal so that the operator and/or controller 201 and/or power source 107 are made aware such that the advancement of the electrode 101 is stopped.

It is noted that the above description of the detection circuit 113 focused on use with the wire 101. However, the configuration of the detection circuit 113, or a similarly configured circuit can also be used when the contact tip 123 itself acts as the touch sensor. It is further noted that it is within the knowledge of those skilled in the art to use the same detection circuit 113 for detection through the wire 101 and the contact tip 123. Stated differently, in an embodiment of the invention the same detection circuit 113 can be used for both detection operations, that is (1) detection of the tip 123 on the work piece 111 and detection of the wire 101 contacting the work piece 111. A skilled artisan would be able to develop control circuitry and/or programming needed to effect this embodiment.

An exemplary method of employing the present invention will now be discussed, with reference to FIG. 1.

As discussed above, during MIG welding (for example) wire 101 is constantly consumed during the welding process. As one wire source 103 runs out of wire 101 it is to be replaced with a new source 103. Thus the operator replaces the source 103 and feeds the leading edge of the wire 101 through the wire feeding apparatus 105. The operator also needs to determine or otherwise set the desired stick out distance D (if changing from the previous operation). This can be done automatically or manually. For example, the operator can engage a reset switch, or the like, or otherwise enter the distance D into a control device (not shown) such that the gun 109 is moved into position to provide the needed stick out distance D. This can also be done manually, where the operator manually positions the contact tip 123 at the proper stick out distance D.

In a further exemplary embodiment, the system 100 is equipped with the touch sensing contact tip 123 as described above (coupled to the power source 107 via an electrical connection 125). This is an exemplary embodiment of automatically setting the distance D. In this embodiment, once the operator is ready for the reload operation the operator engages the needed controls (not shown) to start the reload operation. If the stick out distance D is desired to be changed the operator can input the new distance D into the power source 107, or whatever control mechanism is being used, or a default of previously set distance D may be used. Then, the contact tip 123 is moved to a predetermined (or arbitrary) starting position above the work piece 111 and then moved down towards the work piece 111. As this operation occurs, a detection circuit (not shown, but could be the same or similar to that show in FIG. 3) transmits a low voltage signal along wire 125 to the tip 123. Once the tip 123 makes contact with the work piece 111 or short circuit is detected. The detection of the short circuit causes the movement of the tip 123 to stop and indicates to the power source 107, operator and/or any control device that the surface of the work piece 111 has been located. Once this occurs, the power source 107 and/or control device moves the contact tip 123 away from the work piece the set distance D. Once the distance D is achieved the wire feeding operation can begin. It is noted that the movement and control of the gun 109/tip 123 occurs via conventionally used and known methods and devices, such as those used in current robotic welding operations.

Once the operator is confident that the wire feeding apparatus 105 has sufficient contact with the wire 101 to begin wire payoff the operator activates the wire feeding operation. In an exemplary embodiment of the invention, the operator can activate the wire feeding operation via a control switch on the wire feeding apparatus 105. In an alternative embodiment, the control switch can be located on the power source 107. In yet a further embodiment, the control switch can be located on a pendant control (not shown) which is remote from both the wire feeding apparatus 105 and the power source 107 and communicates (via electrical or wireless connection) with either one of, or both, of the wire feeding apparatus 105 and power source 107. In an alternative embodiment of the invention, the gun 109/tip 123 automatically positions itself to the distance D above the work piece when the wire feeding control switch is engaged (as described above). Of course, it is contemplated that other embodiments are possible. For example, it is contemplated that the replacement of the source 103 and/or the initial wire feeding operation be performed automatically or semi-automatically, such that operator involvement is minimized or eliminated.

In an embodiment of the invention, the wire 101 is encoded with data, such as wire type/size to aid in the wire loading process. Namely, a reader device (not shown) reads the encoded data on the wire 101 and various settings of the wire feeding apparatus 105 and/or power source 107 are set based on the encoded data. Further, the wire 101 may be encoded with length information such that the length of the remaining wire and/or consumed wire can be monitored.

Once the wire feeding operation is initiated the power source 107 provides a current and a voltage to the wire 101 as it is being advanced toward the welding gun 109. The supplied current and voltage may be kept relatively low, as a current and voltage for welding is not needed, although any level can be used. In an embodiment of the present invention, the power source 107 is electrically coupled to the wire independent of the wire feeding apparatus 105, as shown in FIG. 1. The electrical coupling can be effected by any appropriate means, including via the connection 125. For example, the power source 107 can be electrically coupled to electrically conductive rollers (not shown) through which the wire 101 passes such that the signal is transmitted to the wire 101. In another exemplary embodiment, the power source 107 is electrically coupled to the wire 101 via the wire feeding apparatus 105 (not shown). For example, the power source 107 can be electrically coupled to the rollers (not shown) within the wire feeding apparatus 105 such that the current and voltage are imparted to the wire 101 via the wire feeding rollers. The present invention is not limited in this regard, as any known, conventional, or appropriate means of transferring the signal from the source 107 to the wire 101 may be employed.

At some time after a current and voltage are provided to the wire 101, the wire 101 is fed to a point where it makes contact with the work piece 111. When this occurs a short circuit is created between the wire 101 and the work piece 111. The detection circuit 113 detects that a short circuit has occurred and provides a signal to either, or both, of the power supply 107 and wire feeding apparatus 105, at which time the wire feeding process is stopped with a distance D between the welding gun 109 and the work piece 111. After this, the gun 109 and/or the work piece 111 can be positioned to a position for the welding operation, and then a welding current and voltage from the power source 105 are passed through the wire 101 to conduct the welding.

The stick out distance D is a distance determined based on the desired starting stick out for a given welding operation. The distance D will vary based on the welding operation to be performed and the present invention is not limited in this regard.

In an embodiment of the present invention, prior to performing the wire feeding operation, the welding gun 109/tip 123 is moved into a desired position, for example over the work piece 111, so that the proper welding distance can be achieved. This process can be either manually or automatically performed. Stated differently, it may not be desirable to begin the welding operation with the wire 101 in contact with the work piece 111, so it is contemplated that once the distance D (desired stick out) is achieved the gun 109/tip 123 and wire 101 are moved into proper welding position, if needed.

For example, the operator may position the welding gun 109 so that the proper distance exists between the tip of the welding gun 109 and a work piece 111 (for example). Once the proper positioning is achieved the operator initiates the wire feeding operation, which automatically ends when the detection circuit 113 detects the short and triggers the end of the process.

Alternately, during an initial wire feeding operations a computer or like device within the power source 107 automatically positions the welding gun 109 at the proper distance D once there is an indication that the wire feeding process is about to begin. The operator may select a wire feeding option or command at an input terminal (not shown) of the power source 107 and then the power source 107, or similar controlling device, positions the gun 109 at the proper distance. Once the distance D is set the wire feeding process operates until such time as a short in the wire 101 is detected. The detection indicates the proper stick out distance D is achieved. Once this is accomplished wire feeding is stopped and the gun 109 or work piece 111, or a combination of both, are properly positioned (height and lateral positioning) so the welding operation may begin.

Figure 2:
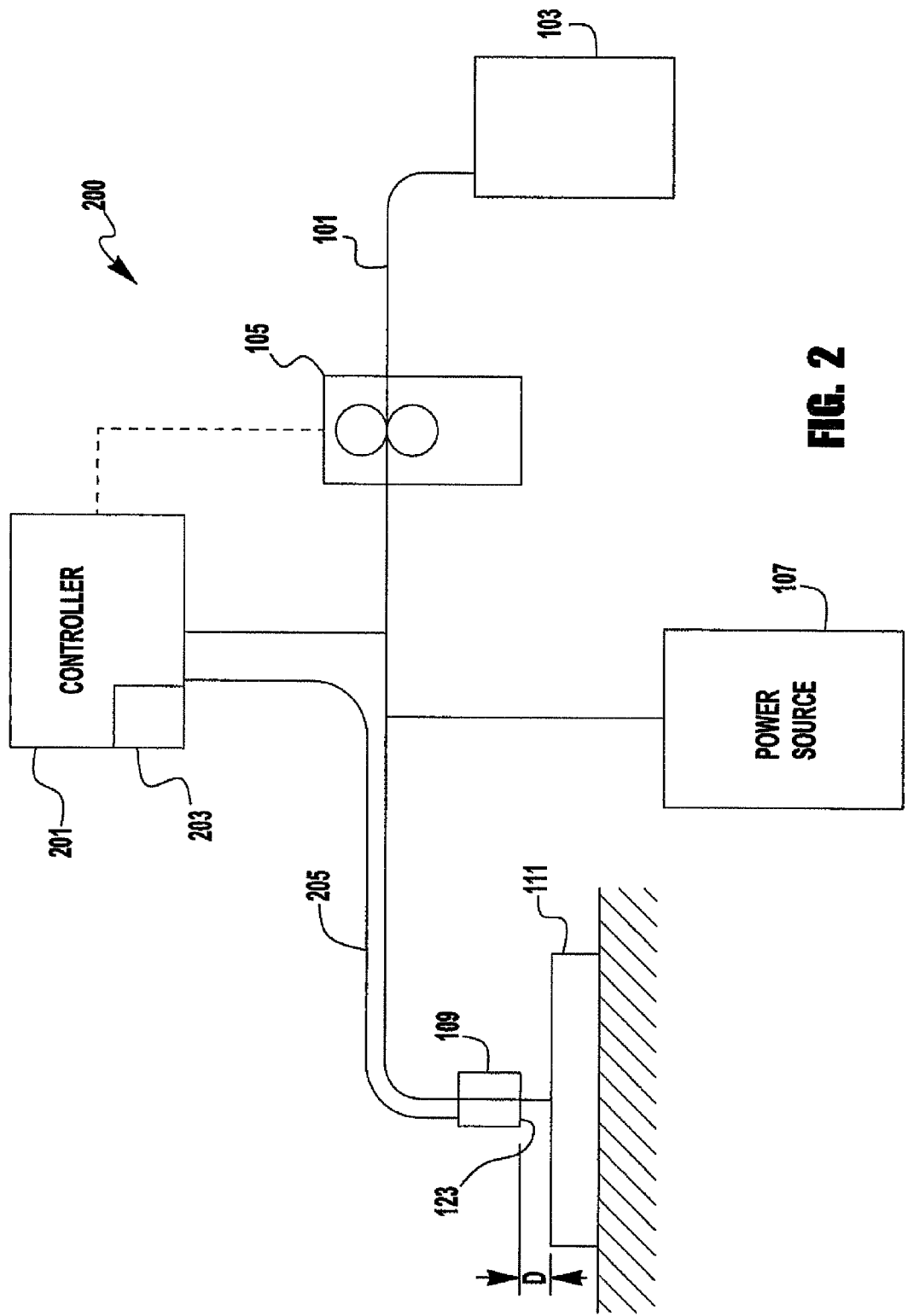
FIG. 2 illustrates a diagrammatical representation of another exemplary embodiment of the present invention.

FIG. 2 depicts another embodiment of a system 200 according to the present invention. In this embodiment, a separate controller 201 is used to control the wire feeding operation, rather than a control mechanism within the power source 107. Operationally, the system 200 works similarly as that described regarding FIG. 1. However, in this embodiment, the wire feeding operation is controlled by a controller 201 separate from the power source 107 and the detection circuit 203 is located within the controller 201. In this embodiment, the controller 201 controls the wire feeding apparatus 105 and provides a current and voltage to the wire 101 to effect the wire feeding operation. The detection circuit 203 detects the short circuit and signals the wire feeding apparatus 105 to stop feeding the wire 101. In an embodiment of the invention, the current/voltage are sent to the wire via the connection 205 and the contact tip 123, as well as the welding waveform.

In yet a further alternative embodiment of the invention, the controller 201 controls the wire feeding operation as described above, but the power source 107 provides the current and voltage to the wire during the wire feeding operation. This is done because the power source 107 is already configured to provide a voltage and current to the wire 101 (during a welding operation) and thus avoids the duplication of circuitry in the controller 201. In this embodiment, the controller 201 is coupled to and communicates with both the power source 107 and the wire feeding apparatus 105 to effect the wire feeding operation. In such an embodiment, the controller 201 causes both the power source 107 and wire feeding apparatus 105 to begin the wire feeding operation (providing current and voltage and feeding the wire 101, respectively) and when the detection circuit 203 detects a short circuit in the wire 101 communicates with both the wire feeding apparatus 105 and the power source 107 to end the wire feeding operation.

As with the embodiment shown in FIG. 1, the embodiment shown in FIG. 2 can also provide touch sensing for the contact tip 123 via the electrical connection 205 to the controller 201. Thus, as described above, the controller 201 controls the movement of the contact tip 123 toward the work piece 111 and provides the needed voltage/current to the tip 123. Once the tip 123 makes contact with the work piece 111 the controller 201 detects the created short and causes the movement of the tip 123 to stop. The controller 201 (or another controller not shown) causes the tip 123 to be moved away from the work piece 111 by the needed stick out distance D and then continues or begins the advancement of the wire 101 until the wire makes contact, thus providing the needed stick out distance D. At that time, the tip 123 and wire 101 can then be moved to any proper position/height to begin the welding operation.

While the invention has been particularly shown and described with reference to exemplary embodiments thereof, the invention is not limited to these embodiments. It will be understood by those of ordinary skill in the art that various changes in form and details may be made therein without departing from the spirit and scope of the invention as defined by the following claims.

What is claimed is:

1. A welding wire feeding apparatus, comprising:
   a control device which positions a welding gun a set distance above a work piece to be welded;
   a wire feeding device which feeds a wire to said welding gun;

a power source which provides a current and a voltage to said wire while said wire feeding device is feeding said wire; and a short circuit detection circuit coupled to said wire feeding device, wherein when said short circuit detection circuit detects a short circuit in at least one of said wire and said welding gun, said wire feeding device stops feeding said wire based on said detection of said short circuit, and wherein said welding gun comprises a contact tip and said short circuit detection circuit causes said wire feeding device to stop said wire such that a stick out distance of said wire with respect to said contact tip is said set distance, said short circuit detection circuit including a power supply to apply a voltage to at least one of said wire and said contact tip and a voltage monitoring system for monitoring the voltage in the at least one of said wire and said contact tip and comparing the monitored voltage to a reference voltage.

2. The welding wire feeding apparatus of claim 1, wherein the short circuit detection circuit detects a change in the current or the voltage, or a combination of both in said wire.

3. The welding wire feeding apparatus of claim 1, wherein said short circuit detection circuit comprises a contact tip detection circuit coupled to said contact tip which detects a short circuit between said contact tip and said work piece when said contact tip makes contact with said work piece.

4. The welding wire feeding apparatus of claim 1, wherein said short circuit detection circuit is integral to said power source and said power source is coupled to said wire feeding device.

5. The welding wire feeding apparatus of claim 1, further comprising a controller which controls said wire feeding device.

6. The welding wire feeding apparatus of claim 5, wherein said controller comprises said short circuit detection circuit.

7. The welding wire feeding apparatus of claim 1, wherein said power source provides said voltage and said current to said wire through said wire feeding device.

8. A method of feeding welding wire, the method comprising:
   positioning a welding gun a set distance from a surface of a work piece where said distance corresponds to a stick out distance defined by a welding operation;
   passing a wire through said welding gun toward said surface;
   providing a current and a voltage to said wire as said wire approaches said surface;
   detecting when said wire contacts said surface, said detecting including monitoring said voltage and comparing said voltage to a reference voltage; and
   automatically stopping said wire when contact is detected so that said wire extends from said gun at a distance which corresponds to said desired stick out distance.

9. The method of claim 8, wherein said detection step comprises detecting at least one of a short circuit in said wire, a change of voltage in said wire and a change of current in said wire.

10. The method of claim 8, further comprising positioning said welding gun at a welding position after said stopping step.

11. The method of claim 8, wherein said current and said voltage are providing through a wire feeding device which performs said passing step.

12. The method of claim 8, further comprising passing a current and voltage for said welding operation through said wire after said stopping step.

13. The method of claim 8, wherein said current and voltage are provided to said wire through a wire feeding device used to perform said passing step.

14. The method of claim 8, wherein said positioning step comprises:
   moving a contact tip of said welding gun toward said work piece;
   providing a current and voltage to said contact tip;
   detecting when said contact tip contacts said work piece;
   automatically stopping said contact tip when contact between said contact tip and said work piece is detected; and
   positioning said contact tip so that a distance between said contact tip and said work piece is said set distance.

15. The method of claim 14, wherein said contact tip detection step comprises detecting at least one of a short circuit in said contact tip, a change of voltage in said contact tip and a change of current in said contact tip.

16. The method of claim 14, further comprising positioning said welding gun at a welding position after said stopping step.

17. The method of claim 14, wherein said voltage and current for said contact tip are provided from at least one of a power source and controller.

18. The method of claim 14, further comprising passing a current and voltage for said welding operation through said wire after said stopping step.

* * * * *